US011190355B2

(12) United States Patent
Wang (10) Patent No.: US 11,190,355 B2
(45) Date of Patent: Nov. 30, 2021

(54) SECURE BIOMETRIC AUTHENTICATION USING ELECTRONIC IDENTITY (71) Applicant: Visa International Service Association, San Francisco, CA (US)

(72) Inventor: Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 139 days.

(21) Appl. No.: 16/618,741

(22) PCT Filed: Jun. 2, 2017

(86) PCT No.: PCT/US2017/035783
§ 371 (c)(1),
(2) Date: Dec. 2, 2019

(87) PCT Pub. No.: WO2018/222211
PCT Pub. Date: Dec. 6, 2018

(65) Prior Publication Data
US 2020/0092102 A1 Mar. 19, 2020

(51) Int. Cl.
*H04L 9/32* (2006.01)
*H04L 29/06* (2006.01)
*G06F 21/32* (2013.01)

(52) U.S. Cl.
CPC ............ *H04L 9/3231* (2013.01); *G06F 21/32* (2013.01); *H04L 9/3247* (2013.01); *H04L 63/0861* (2013.01)

(58) Field of Classification Search
None
See application file for complete search history.

(56) References Cited

U.S. PATENT DOCUMENTS 6,236,655 B1 * 5/2001 Caldara ............ G06F 15/17375
370/395.31
8,752,146 B1 6/2014 Van Dijk et al.
(Continued)

FOREIGN PATENT DOCUMENTS

JP 2011257818 12/2011
JP 2014219711 11/2014
(Continued)

OTHER PUBLICATIONS

PCT/US2017/035783, "International Search Report and Written Opinion", dated Feb. 9, 2018, 14 pages.
(Continued)

*Primary Examiner* — Benjamin E Lanier
(74) *Attorney, Agent, or Firm* — Kilpatrick Townsend & Stockton LLP (57) ABSTRACT Embodiments of the invention are directed to a method. The method may comprise receiving a second biometric template of a user, and providing an authentication request message comprising an electronic identity and a derivative of the second biometric template of the user to a resource provider computer to conduct an interaction. The authentication request may be forwarded to a processing server computer by the resource provider computer, and the user device may receive an authentication response message comprising an authentication result from the processing server computer. The authentication result may be determined by the processing server computer based on a comparison of the derivative of the second biometric template to a derivative of a first biometric template accessible to the processing server computer. The authentication result may also be based on the validity of the electronic identity.

12 Claims, 5 Drawing Sheets

(56) References Cited

U.S. PATENT DOCUMENTS

| | | | |
|---|---|---|---|
| 2003/0004834 A1* | 1/2003 | Yamazaki | G06Q 20/02 |
| | | | 705/26.1 |
| 2006/0112278 A1 | 5/2006 | Cohen et al. | |
| 2006/0226951 A1* | 10/2006 | Aull | G06Q 20/4014 |
| | | | 340/5.61 |
| 2007/0220274 A1* | 9/2007 | Jensen | H04L 9/3234 |
| | | | 713/186 |
| 2008/0209226 A1* | 8/2008 | Venkatesan | H04L 9/3231 |
| | | | 713/186 |
| 2009/0287930 A1* | 11/2009 | Nagaraja | H04L 9/08 |
| | | | 713/171 |
| 2011/0072493 A1* | 3/2011 | Morishita | H04L 63/0853 |
| | | | 726/3 |
| 2013/0318359 A1 | 11/2013 | Morris et al. | |
| 2014/0016834 A1 | 1/2014 | Endoh et al. | |
| 2015/0317851 A1 | 11/2015 | Linnartz | |
| 2017/0055146 A1* | 2/2017 | Ko | H04L 63/0492 |
| 2018/0069854 A1* | 3/2018 | Chakraborty | H04L 9/3231 |
| 2018/0241728 A1* | 8/2018 | Burgess | H04L 9/0861 |
| 2018/0248699 A1* | 8/2018 | Andrade | H04L 9/0897 |
| 2020/0145219 A1* | 5/2020 | Sebastian | H04L 9/3236 |

FOREIGN PATENT DOCUMENTS

| | | |
|---|---|---|
| WO | 2012124115 | 9/2012 |
| WO | 2017066002 | 4/2017 |
| WO | 2017083016 | 5/2017 |

OTHER PUBLICATIONS

EP17911928.4, "Extended European Search Report", dated Apr. 9, 2020, 8 pages.

PCT/US2017/035783, "International Preliminary Report on Patentability", dated Dec. 12, 2019, 11 pages.

SG11201910964Y, "Written Opinion", Apr. 9, 2021, 7 pages.

* cited by examiner

SECURE BIOMETRIC AUTHENTICATION USING ELECTRONIC IDENTITY

CROSS-REFERENCES TO RELATED APPLICATIONS

This application is a National Stage of International Application No. PCT/US2017/035783, International Filing Date Jun. 2, 2017, the disclosure of application being incorporated herein by reference.

BACKGROUND

In today's technological environment, it is typical for individuals to carry around identification cards for proving their identity. The identification cards may be issued by a government agency or financial institution, which may assign an identification number or account number to a user. An identification card may have an identification number, the user's name, and possibly a photograph of the user printed, embossed, and/or stored on the card. When a user wants to prove his or her identity, the user may present the card, and any credentials on the card may be verified to authenticate the user.

A number of issues may arise from the use of identification cards as a means of identification. Firstly, users often have to carry around multiple identification cards in order to receive a variety of good and/or services. For example, a user may carry a driver's license, multiple credit/debit cards, a social security card, a medical insurance card, etc. This may be inconvenient for the user, and may further increase the chances of a user's identity being stolen. In addition, the use of identification cards may be especially inconvenient when presenting credentials online, when users often need to scan or even manually enter their information. Secondly, the validity of an identification card is often subject to human evaluation, which can be inconsistent and assumes that a person evaluating an identification card is trustworthy. This may lead to further inconveniences for a user, such as an employee that may steal a user's information, or an employee that may view an identification card as invalid due to a slight change in a user's appearance. Lastly, the human factor of identification is often lacking or unsatisfactory in its implementation when it comes to identification cards. That is to say, that identification systems that utilize cards often do not require biometric authentication, and those that do expect users to trust that their biometric data cannot be stolen and used in unwanted ways.

What is needed in the art, is a secure method for proving one's identity.

BRIEF SUMMARY

Embodiments of the invention are directed to a method. The method may comprise receiving a second biometric template of a user, and providing an authentication request message comprising an electronic identity and a derivative of the second biometric template of the user to a resource provider computer to conduct an interaction. The authentication request may be forwarded to a processing server computer by the resource provider computer, and the user device may receive an authentication response message comprising an authentication result from the processing server computer. The authentication result may be determined by the processing server computer based on a comparison of the derivative of the second biometric template to a derivative of a first biometric template accessible to the processing server computer. The authentication result may also be based on the validity of the electronic identity.

The method may further comprise receiving the first biometric template of the user, generating the derivative of the first biometric template, and generating an identity request message for an electronic identity for the user. The identity request message may comprise the derivative of the first biometric template and an account identifier of the user. In addition, the method may comprise sending the identity request message to a verification server, wherein the verification server verifies the account identifier and generates the electronic identity. The electronic identity may be linked to the derivative of the first biometric template in a database by the processing server computer. The method may also comprise receiving an identity response message comprising the electronic identity, and storing the electronic identity in a memory of the user device for later use in an interaction.

Other embodiments of the invention are directed to systems, apparatuses, portable consumer devices, and computer readable media associated with methods described herein.

A better understanding of the nature and advantages of the present invention may be gained with reference to the following detailed description and the accompanying drawings.

TERMS

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers.

An "application program interface" or "API" may refer to software specifying how components of a system should interact. The API may comprise a set of routines, protocols, and tools on which software applications may built. An API may be for a web-based system, operating system, database system, computer hardware or software library, and may include specifications for routines, data structures, object classes, variables and/or remote calls.

The term "gateway" may refer to hardware or software that allows for the interfacing of network nodes using different protocols. The interface can include protocol converters, proxy servers, routers, firewalls, etc. A gateway may also be referred to as a "network gateway." For example, a computer that controls the traffic from an Internet Service Provider (ISP) may be a network gateway.

The term "authentication" may refer to the process of verifying the identity of something (e.g., a user). One form of authentication can be biometric authentication.

A "biometric" may be any human characteristic that is unique to an individual. For example, a biometric may be a person's fingerprint, face, DNA, etc.

A "biometric reader" may refer to a device for capturing data from an individual's biometric sample. Examples of biometric readers may include fingerprint readers, front-facing cameras, microphones, and iris scanners.

A "biometric sample" may refer to data obtained by a biometric reader. The data may be either an analog or digital representation of the user's biometric, generated prior to determining distinct features needed for matching. For example, a biometric sample of a user's face may be image data. In another example, a biometric sample of a user's voice may be an audio file.

A "biometric template" may refer to a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual.

The term "zero-knowledge proof" or "zero-knowledge protocol" may refer to a method of proving information is true without conveying the actual information itself. In a zero-knowledge protocol, secret information can be verified without be revealed. More information regarding zero-knowledge proofs may be found at:

J. Camenisch and M. Stadler. Proof systems for general statements about discrete logarithms. Technical Report TR 260, Institute for Theoretical Computer Science, ETH Zürich, March 1997.

In some embodiments, the comparison of derivatives of biometric templates to verify the authenticity of a particular person may employ a zero-knowledge protocol.

The term "blockchain" can be a distributed database that maintains a continuously-growing list of records secured from tampering and revision. A blockchain may include a number of blocks of interaction records. Each block in the blockchain can contain also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a verification network. Any node within the verification network may subsequently use the blockchain to verify transactions. The security of a blockchain may be obtained using a cryptographic scheme.

A "digital signature" may refer to data used to provide assurance or evidence as to the origin and identity of an electronic record or message. Digital signatures can be based on public key cryptography (i.e. asymmetric cryptography). Digital signatures may be generated using a public key algorithm such as RSA. To create a digital signature, signing software may be used to create a one-way hash of electronic data that is to be signed by a signing entity. A private key of the signing entity is then used to encrypt the hash and form the digital signature.

The term "validation" may refer to the act of checking or affirming that information is legitimate. An example may be the act of checking that a digital signature appended to an electronic record is, in fact, legitimate and of the signing entity. Digital signatures may be validated according to a verification algorithm in conjunction with a signing entity's public key.

An "electronic identity" or "eID" may refer to a unique string of characters or symbols used to identify an individual. In preferred embodiments, the electronic identity may be mathematically derived from information associated with a user. For example, in some embodiments, an electronic identity may be a value calculated by hashing one or more input values (customer name, country code, etc.) available to multiple entities. In this way, the electronic identity may be independently generated by any entity that has the prerequisite information. An electronic identity may be altered (e.g., hashed and/or encrypted) information associated with a user. For example, in some embodiments, an electronic identity may be derived from a combination of a country code, customer name, date of birth, and last four digits of a social security number such as SHA256 (USA*JOHN SMITH*19700101*1234). Hashing this value may result in a seemingly random string of characters, such as 754WD2E2513BF546050C2D079FF5D65AB6E318E and this can be an electronic identity. In some embodiments, the electronic identity is associated with a passphrase that is provided in order to access any interaction record associated with the electronic identity. An electronic identity may sometimes be referred to as an "eID," electronic identifier, or electronic identification data.

An "account identifier" may refer to a sequence of numbers and/or letters for identifying an account. The account can be a bank account, credit card account, government benefit account, health insurance account, etc. One example of an account identifier may be a primary account number (PAN), which may be a 16-digit number used to identify that a user may use to conduct transactions.

A "know your customer" or "KYC" process may refer to the process of a business identifying and verifying the identity of its clients. The term is also used to refer to the bank and anti-money laundering regulations which govern these activities. A KYC process may be used to verify information of a user and generate an electronic identity for the user.

DETAILED DESCRIPTION

Embodiments provide systems, apparatus, and methods for implementing secure biometric authentication. A biometric may be any human characteristic that is unique to an individual. For example, a biometric may be a person's fingerprint, face, DNA, etc. Biometric authentication may be used to identify individuals in a manner that is more convenient and efficient than typical identification methods. It may be used to identify individuals in a variety of scenarios such as logging into a network, accessing a building, or conducting a transaction. Because biometric authentication uses human characteristics rather than account information or identification cards, users of biometric authentication do not need to worry about remembering usernames and passwords or keeping track of ID cards.

A problem associated with implementing biometric authentication systems is privacy and security. Users often distrust biometric authentication for fear of their biometric data might be stolen or misused. In addition, entities that need to verify a user's identity (e.g. for the purpose of authorizing a transaction) also have a stake in the accuracy of authentication, and may wish to limit the proliferation of identity theft and fake identity creation.

Embodiments of the invention described herein address these issues by passing a user's biometric template through a derivation formula, and linking the derived biometric template to an electronic identity that is validated by trusted parties. The electronic identity may be validated against records stored in a blockchain and according to a digital signature algorithm. In this manner, a user's biometric data remains confidential and goes through multiple validation checks, thus preventing abuse of the authentication system by a fraudulent individual. Embodiments combine blockchain technology with other biometric authentication techniques to provide a secure authentication system available through an application on a user's mobile device. Thus, embodiments of the invention described herein are more secure, more efficient, and more convenient than other identification methods.

Figure 1:
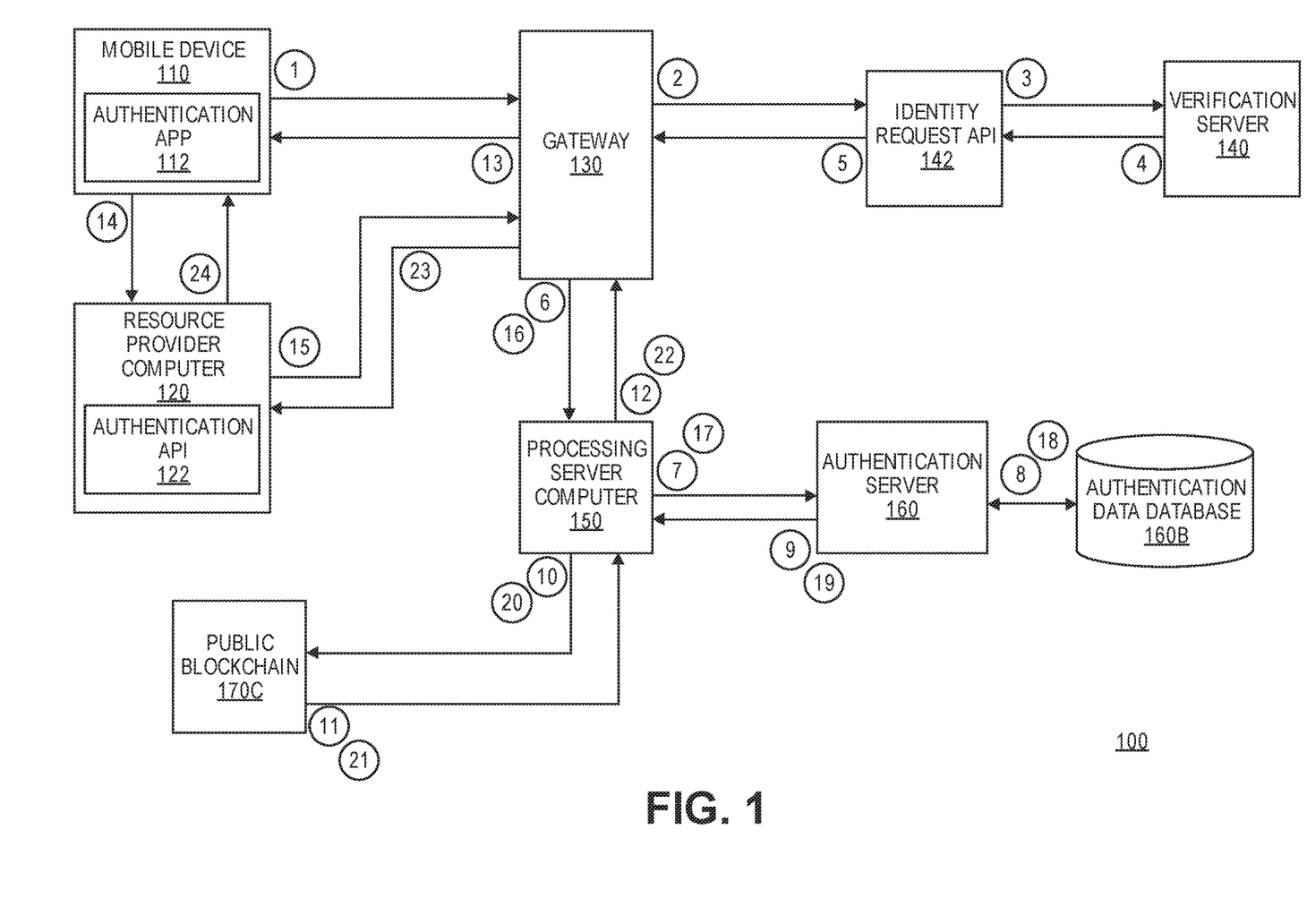
FIG. 1 shows a block diagram of a system for implementing secure biometric authentication.

FIG. 1 shows a block diagram of a system for implementing secure biometric authentication. System 100 may comprise processing server computer 150 for processing authentication requests in secure biometric authentication. Processing server computer 150 may connect to a plurality of servers, computers, and devices across a number of protocols through a network gateway, such as gateway 130. System 100 may also comprise mobile device 110, which may comprise authentication application 112. Authentication application 112 may be an application stored on mobile device 110 that comprises instructions for implementing biometric authentication. This may include instructions for communicating with verification server 140, processing server computer 150, and resource provider computer 120. Authentication application 112 may further comprise instructions for requesting an electronic identity, which may be provided by verification server 140 through identity request API 142.

According to embodiments, a computer of a resource provider, such as resource provider computer 120, may comprise authentication API 122 for authenticating a user of mobile device 110. Resource provider computer 120 may authenticate the user by receiving user data from mobile device 110, which may be forwarded to processing server computer 150 to receive an authentication result. The processing server computer 150 may determine the authentication result through communications with authentication server 160, and based on data stored in authentication data database 160B and in public blockchain 170C.

Mobile device 110 may be any mobile device for communicating and storing user data of a user. For example, mobile device 110 may be a smart phone, smart wearable device (e.g. smart watch or eyewear), or any other portable communications device owned by the user. Mobile device 110 may store and communicate user data by way of one or more applications such as authentication application 112. The user data may include a user's electronic identity and a derivative of the user's biometric template. In one embodiment, mobile device 110 may also comprise a resource provider application for connecting to resource provider computer 120. For example, mobile device 110 may comprise a merchant application, which a user may access to connect to a merchant server computer and make purchases online. Elements of mobile device 110 can be further seen in FIG. 4, further described below.

Authentication application 112 may comprise instructions for receiving user data from a user, storing user data in a memory of mobile device 110, and sending user data over a communication interface such as a wireless interface (e.g. WiFI, Bluetooth, near-field communications, RFID, etc.). For example, authentication application 112 may be a mobile payments application that a user may access in order to present his or her credentials when making a purchase. In one embodiment, authentication application 112 may comprise instructions for generating a biometric template from biometric sample data. The biometric template may be data comprising features of a biometric sample required for accurate matching. The biometric template may comprise minutiae information such as position, type, and angle and/or may comprise pattern information (ridge structure) as described in ISO/IEC JTC 1/SC 37. For example, the biometric template may comprise features of a user's fingerprint data that consistently appear in biometric sample data. This may include features that may be detected no matter where a user's finger is positioned on the fingerprint reader when a sample is taken, such as the relative position that lines (i.e. contours) that make up the user's fingerprint are to one another. In another example, a user may present his or her biometric sample multiple times, and a statistical model may be used to generate a biometric template that captures the top features that have the greatest probability of appearing in a next biometric sample taken from the user. In one embodiment, mobile device 110 or authentication application 112 stored on mobile device may comprise a biometric template generation algorithm, from which identical biometric templates are generated each time a user captures a sample from a specific biometric (e.g. each time he or she presents the same finger, iris, etc.).

Authentication application 112 may further comprise instructions for creating a derivative of a biometric template. For example, authentication application 112 may comprise instructions for passing the biometric template through an algorithm that mathematically alters its data values or removes certain data values to form a derivative of the biometric template. For example, in some embodiments, biometric template may include a string of data, while the derivative of the biometric template may remove or convert some of the data in the string of data at predetermined locations. The derivative of the biometric template may relate to the biometric template, but may not be the entire biometric template. In one embodiment, the algorithm for altering data values may be a one way function in which it is computationally difficult to reverse the operation performed, thus making it nearly impossible to obtain the original template. For example, in one embodiment, biometric template data may be expressed as a string, in which unique and consistent features of the users biometric having a high probability of appearance in a captured sample are converted into a unique sequence of characters. To derive the biometric template, the string including the unique sequence of characters may be passed through a hashing algorithm to generate a unique hash. In another embodiment, the biometric template may be split into multiple parts and the multiple parts each may be passed through the one way function and collected together to form the derivative. For example, a string of characters representing a user's fingerprint template may be divided into 20 strings of equal length, which may each be hashed and the resulting hashes may be appended together to form a derivative.

Resource provider computer 120 may be a computer used to provide resources to a user. In embodiments, the resource may be provided to the user upon authentication of the user's credentials (e.g. user biometric). For example, resource provider computer 120 may be a computer that controls entrance/exit into a building or terminal. In another example, resource provider computer 120 may be a server computer of a merchant, that may be used to authorize access to goods or services. In one embodiment, the server computer of the merchant may be accessed from mobile device 110 using a resource provider application. In yet another example, resource provider computer 120 may be a computer of a government agency, that may be used to confirm an individual's identity (e.g. for the purpose of authorizing access to social security benefits). Resource provider computer 120 may be any computing device for performing computer functions according to embodiments of the invention, such as a personal computer, laptop, tablet, point-of-sale terminal, smart phone, smart wearable device, etc.

Resource provider computer 120 may comprise authentication API 122 for authenticating a user in an interaction (e.g. during a transaction, login attempt, security checkpoint, etc.). Authentication API may comprise instructions for communicating with processing server computer 150 through gateway 130. Authentication API may further comprise instructions for receiving user data in an interaction with the user, and for sending user data to processing server computer 150 to receive an authentication result. In one embodiment, authentication API 122 may comprise software that is provided by an entity of processing server computer 150. Authentication API 122 may comprise instructions for receiving the user data in an authentication request message, which may comprise a derived biometric template of a user and an electronic identity, and may further comprise instructions for forwarding the authentication request message to processing server computer 150 to receive the authentication result. The authentication result may indicate if a user's credentials (i.e. biometric) are legitimate, and may be based on the verification and validation of data received in the authentication request message.

In embodiments, messages between devices during authentication may pass through gateway 130. Gateway 130 may be a network node for interfacing two networks operating using different protocols. The network node may be a physical node provided by hardware or may be a virtual node provided by software. For example, gateway 130 may be software that allows a mobile device or computer to connect, via the internet, to an entity's network, such as that of a bank or payment processing network. In one embodiment, gateway 130 may allow a device comprising authentication application 112 or authentication API 122 to communicate with verification server 140 and/or processing server computer 150.

Verification server 140 may be a server for verifying a user's information to generate an electronic identity for the user. For example, verification server 140 may be a server of a financial institution that may verify a user's bank account information and/or financial documents. In another example, verification server 140 may be a server of a government institution that may verify government documents presented by a user, such as the user's passport, social security number, birth certificate, driver's license, etc. Verification server 140 may generate an electronic identity for a user by way of identity request API 142, which may comprise instructions for receiving identity request messages from a user device. In embodiments, verification server 140 may be any server of an entity possessing the means to verify a user's identity so that the user may be enrolled in a biometric authentication program.

According to embodiments, processing server computer 150 may be a server computer for processing data in a network. The network may be, for example, a payment processing network, such as VisaNet. Processing server computer 150 may comprise means for determining an authentication result based on user data, such as a user's electronic identity, biometric, or derivatives thereof. In embodiments, processing server computer 150 may determine the authentication result by comparing data in an authentication request message to data stored in authentication data database 160B and in public blockchain 170C. Processing server computer 150 may authenticate a user by comparing a derivative of a first biometric template of a user to a derivative of a second biometric template of the user. Processing server computer 150 may further authenticate a user by identifying records in a blockchain relating to the electronic identity of the user, and validating digital signatures appended to said records. Elements of processing server computer 150 may further be seen in FIG. 3, further described below.

Authentication server 160 may be a server for authenticating user credentials. In embodiments, the user credentials may include a derivative of a user's biometric template, which may be compared to data stored in authentication data database 160B to authenticate the user. In one embodiment, authentication server 160 may receive, from processing server computer 150, a request for a derivative of a biometric template of a user to be authenticated in an interaction. The request may comprise an identifier for a derivative of a first biometric template of the user registered during enrollment. The derivative of the first biometric template may be retrieved from authentication data database 160B, and sent to processing server computer 150 for comparison against a derivative of a second biometric template of the user during authentication.

In another embodiment, authentication server 160 may compare the derivative of the first and second biometric templates during authentication. For example, during a request to access a building, processing server computer 150 may forward an authentication request message comprising a derivative of a user's iris data. The derivative may be user iris data that has been passed through an algorithm in order to prevent the user's iris data from being transmitted in the clear. Authentication server 160 may receive the derivative in the authentication request message and may query authentication data database 160 for a matching derivative of the user's iris data. Authentication server 160 may determine if a match exists, and send the result to processing server computer. Depending on the match results, the user may be authenticated for access to the building. In yet another embodiment, authentication server 160 and processing server computer 150 may be the same server or may be of the same entity.

In addition to the comparison of data relating to biometrics, authentication of a user in system 100 may also comprise validating records of a distributed database. Specifically, the distributed database may be a blockchain, such as public blockchain 170C. Public blockchain 170C may be a public ledger of immutable blocks. Each immutable block in public blockchain 170C may reference a previous block, such that the blocks are linked in a chain. Copies of the public blockchain 170C may be distributed to multiple nodes in a network. According to embodiments, public blockchain 170 may comprise signed records for validating an electronic identity of a user. The signed records may be validated by trusted nodes. For example, public blockchain may comprise data blocks that may be verified by trusted server computers, capable of verifying digital signatures in a public key encryption scheme. The digital signatures may be digital signatures of banks or government institutions that may have facilitated the creation of an electronic identity for the user.

Flows 1 through 24 show the flow of data in implementing a biometric authentication process carried out by system 100. This may include both enrollment and execution of a biometric authentication program. A user may first enroll into a biometric authentication from his or her mobile device. Enrollment may involve verifying the user's identity at verification server 140 (flows 1 through 3), which may then generate an electronic identity for the user. The electronic identity may then be sent to processing server computer 150 (flows 4 through 6) so that the identity may be linked to user authentication data (e.g. a derivative of the user's biometric template). The authentication data may be stored in authentication data database 160B (flows 7 through 9), and a record of the electronic identity and authentication data being linked may be written into public blockchain 170C (flows 10 through 11). The electronic identity may then be sent to the user's mobile device 110 for later use in an interaction (flows 12 through 13). When a user wants to prove his or her identity (e.g. during a transaction) the user may send his or her authentication data from mobile device 110 to resource provider computer 120 (flow 14). The resource provider computer may then send the user's data to processing server computer 150 (flow 16), and the processing server computer may compare the data against data in authentication data database 160B (flows 17 through 19) and against records published to public blockchain 170C (flows 20 through 21) to determine an authentication result. The authentication result may then be sent to the resource provider computer 120 and mobile device 110, so that the user and resource provider can be informed as to whether or not the user's identity has been successfully authenticated (flows 22 through 24).

More detail about the processing steps that occur during the flow shown in FIG. 1 are explained in the description of FIG. 2A and FIG. 2B further below. Flows 1 to 3 may correspond to steps S201 through S206 of FIG. 2A. Flows 3 to 6 may correspond to steps S207 through S210. Flows 6 to 9 may correspond to steps S211 through S212. Flows 9 to 11 may correspond to step S213. Flows 11 through 13 may correspond to steps S214 through S215. Flows 14 to 16 may correspond to steps S216 through S221. Flow 16 may correspond to step S222. Flows 16 to 19 may correspond to steps S223 through S225. Flows 19 to 22 may correspond to steps S226 through S228. And flows 22 through 24 may correspond to step S229.

Figure 2A:
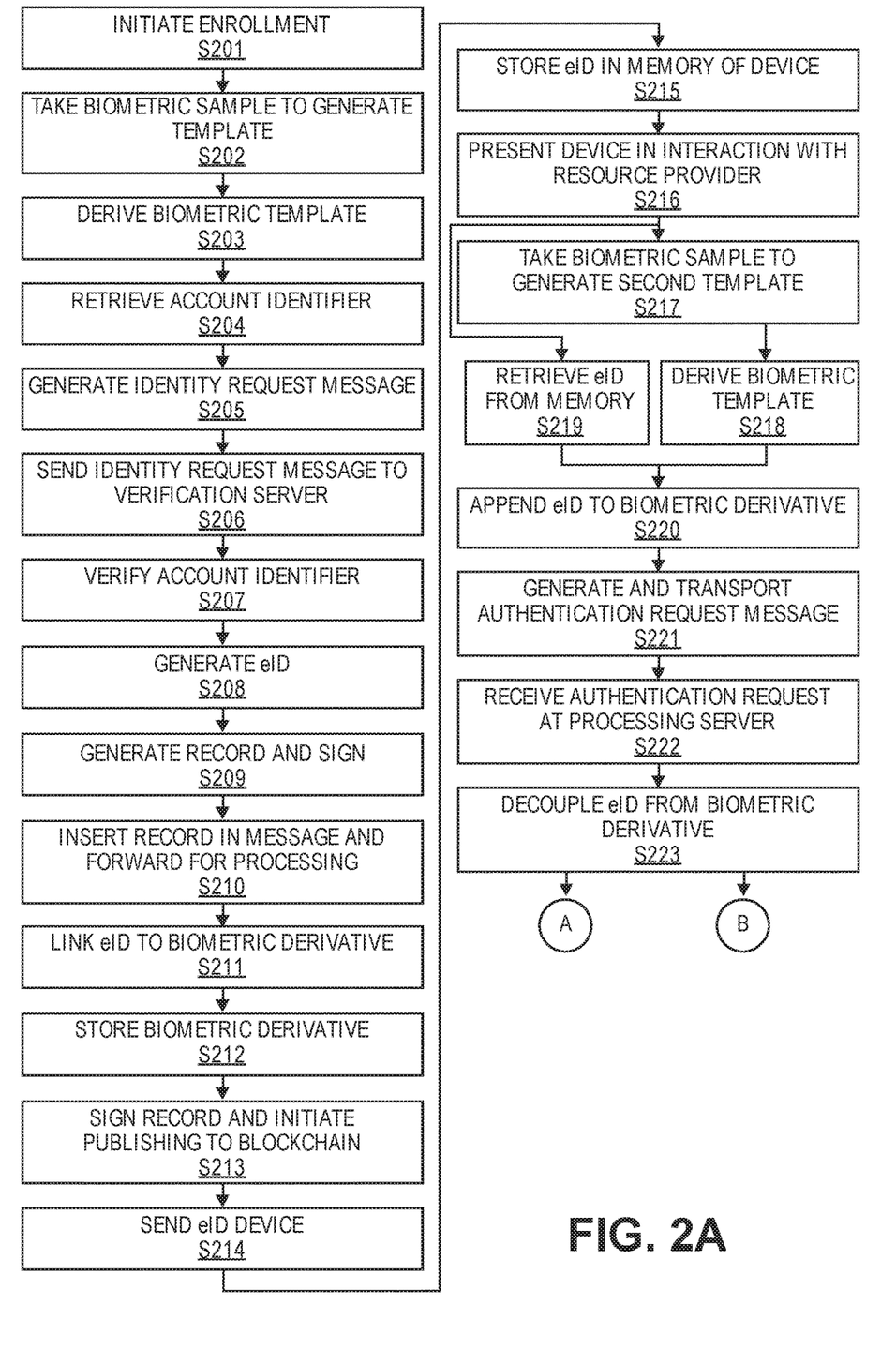
FIGS. 2A and 2B show a process flow diagram for implementing secure biometric authentication.
Figure 2B:
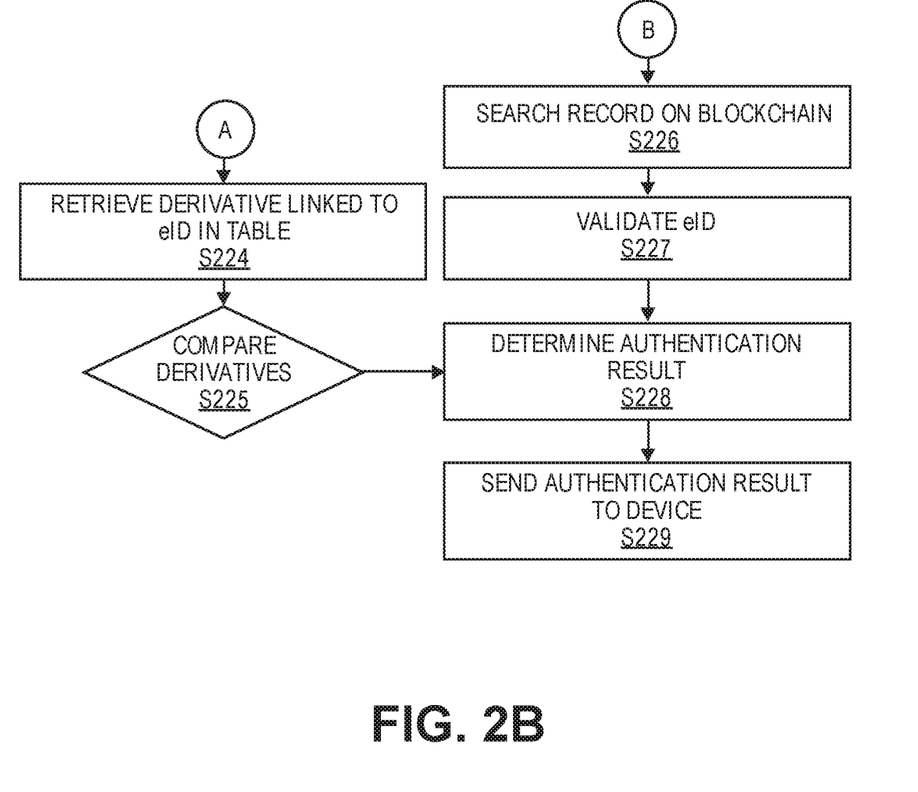

FIGS. 2A and 2B show a process flow diagram for implementing secure biometric authentication. Specifically, steps S201 through S229 describe a process for enrolling and using an electronic identity in conjunction with biometric authentication software stored on a user device. According to embodiments, steps S201 through S229 may be performed by the system components of system 100 in FIG. 1.

At step S201, a user of a mobile device may initiate enrollment into a biometric authentication program. In one embodiment, this may be done using an authentication application stored on the user's mobile device. The authentication application may be an application that may be installed onto a user's mobile device. The authentication application may further store application data in memory, which may include data for generating a biometric template, data for a derivation formula, and data for an electronic identity of a user. To initiate enrollment, a user may open/load the authentication application from his or her mobile device and the authentication application may prompt the user to select an option to enroll into a biometric authentication program (e.g. by selecting the option using an input element of the mobile device).

At step S202, upon initiation of enrollment, the user may provide his or her biometric sample to the mobile device so that a biometric template of the user may be created. The authentication application may prompt the user to provide his or her biometric sample, which may be used to generate a template containing distinct features of the individual's biometric. Examples of biometric samples may include a sample of a user's fingerprint, a current picture of the user, or a sample of the user's voice. Other examples may include the user's iris, the user's palm, or any other distinguishing feature of the individual. A biometric sample may be read using a biometric reader, which can include a fingerprint reader, front-facing camera, microphone, etc. When a biometric sample is taken from the user, distinctive features of the sample may be represented in digital form as a biometric template. For example, a data file may be created from the capture of electromagnetic signals generated by a biometric reader during sample reading, in which the signals may be binned into discrete bits according to a pre-defined resolution (i.e. as expressed by the number of pixels in an image or by the sample rate of an audio file). Software stored on the mobile device may then be used to identify features of the data file that are needed to accurately authenticate the user. For example, the user may be asked to present his or her biometric multiple times, and a mathematical model may be used to determine features that consistently appear. The features may be represented as a binary digital file, which may form the biometric template.

At step S203, the authentication application stored on the mobile device may generate a derivative of the biometric template of the user. The derivative may be a representation of the biometric template in which the data has been altered, so as to conceal the original feature data of an original biometric template. For example, a binary file representing characteristic features of a user's fingerprint may be passed through a mathematical function that alters each data value in a seemingly random manner. In another embodiment, data values at predetermined locations of a data string representing a biometric template may be removed so obscure the original biometric template. In one embodiment, the mathematical function may be a one-way function based on a zero-knowledge protocol, such as a one-way hashing function. For example, the authentication application may comprise code for recognizing features of a user's fingerprint sample that have a high probability of being captured and identical each time a sample is taken, and may express the features as a unique string of characters that can be identical each time the string of characters is formed. The string may then be passed through a hashing algorithm (e.g. SHA256( )), to generate a unique hash. The unique hash may be used as a derivative of the biometric template that cannot be reproduced from any biometric other than the user's. In another embodiment, the biometric template may be split into multiple parts and the multiple parts each may be passed through the one way function and collected together to form the derivative. For example, a string of characters representing a user's fingerprint template may be divided into 20 strings of equal length, which may each be hashed and the resulting hashes may be appended together to form a derivative. During matching, a derivative may be verified if the consistent features of the user's biometric are captured by a reader and the resulting biometric template or parts of the biometric template match expected results after being passed through the one-way function. According to embodiments, the derivative cannot be reversed engineered to obtain the consistent features of the user's biometric sample.

In one embodiment, a derivative may be generated by tokenizing a biometric template and transporting the derivative through a zero-knowledge security layer. The zero-knowledge security layer may be an additional blockchain layer that uses a zero-knowledge proof to shield the source and anonymize the contents of data published to the blockchain. For example, a biometric template may be derived by generating a token, in which the token is committed to specific conditions such as a specific time of use and/or specific receiving address in order to be valid. The token may be, for example, a string of characters that can be verified using a zero-knowledge proof, and that can only be used for its committed purpose and if a hidden and random number, r, is known. The token may then be used as a record in place of the template data, such that the derivatives may be anonymized.

More information regarding zero-knowledge security layers may be found at:

Eli Ben Sasson, Alessandro Chiesa, Christina Garman, Matthew Green, Ian Miers, Eran Tromer, Madars Virza, "Zerocash: Decentralized Anonymous Payments from Bitcoin", Security and Privacy (SP) 2014 IEEE Symposium on, pp. 459-474, 2014, ISSN 1081-6011.

At step S204, the mobile device may retrieve an account identifier of the user. The account identifier may be an identifier for an account issued to the user, such as a bank account or social security account. In other examples, the account identifier may be a primary account number (PAN), driver's license number, passport ID number, username and password, etc. The account identifier may be entered into the mobile device by the user or may be retrieved from a memory of the mobile device, such as from a secure element of the device or from application data. In other embodiments, the account identifier may be retrieved from a cloud-based server, or may be provided through another application on the mobile device, such as a digital wallet application.

At step S205, the mobile device may generate an identity request message. The identity request message may comprise the derivative of the biometric template of the user and the account identifier. The identity request message may be generated after the biometric template of the user has been derived and after the account identifier has been retrieved. In one embodiment, the message may be sent upon indication by the user. For example, the authentication application may comprise instructions for displaying a selectable option to the user, which when selected may result in the generation and sending of the identity request message. In some embodiments, the identity request message may comprise additional information of the user such as his or her name, address, date of birth, etc.

At step S206, the identity request message may be sent from the mobile device to a verification server. The verification server may be a server of a verification entity, such as a government agency or bank. The identity request message may be sent from the mobile device to the verification server by way of a network gateway, such as gateway 130 of FIG. 1. For example, the gateway may be a network node capable of receiving the identity request message over the Internet and forwarding the message to a bank's server. The verification server may be able to receive and send messages over the network gateway via an API, such as identity request API 142 of FIG. 1.

At step S207, the verification server may verify the account identifier of the user. According to embodiments, the verification server may receive the identity request message and may identify data fields for the account identifier and derivative of the biometric template. The verification server may then compare the account identifier to an account identifier stored in an account database, and may verify the validity of the account identifier and any additional user information. For example, a bank server may receive a bank account number and a user's name in the identity request message and may verify that the bank account number exists, is under the user's name, and is in good standing. In one embodiment, the verification server may further perform other checks on the user such as credit inquiries, criminal background checks, etc., which may affect whether or not the user is verified into the authentication program. In one embodiment, the user's information may be verified according to a "know your customer" or KYC process.

At step S208, the verification server may generate an electronic identity for the user if the account identifier has been verified. In one embodiment, the electronic identity, or eID, may be mathematically derived from information associated with the user. The electronic identity may be a value calculated by hashing one or more input values. For example, the electronic identity may be derived from a combination of a country code, customer name, date of birth, and last four digits of a social security number of a user, such as SHA256(USA*JOHN SMITH*19700101*1234). Hashing this value may result in a seemingly random string of characters, such as 754WD2E2513BF546050C2D079FF5D65AB6E318E, and this can be an electronic identity, or eID, for the user.

At step S209, the verification server may generate a record for the electronic identity and derivative of the first biometric template being linked or associated with one another, and may sign the record using its private key. According to embodiments, the record may serve as a certificate of enrollment into the biometric authentication program. The record may comprise hashes of the electronic identity and the derivative of the biometric template of the user. For example, the record may comprise a hash that is the result of concatenating strings for the electronic identity and derivative and inputting the concatenated string into SHA256( ). The record may also comprise time information relating to the time at which the verification verified the user's information. The record may then be signed by the verification server according to a digital signature algorithm. For example, a Federal Information Processing Standard Digital Signature Algorithm (DSA) may be used in conjunction with a bank's private key to generate a verifiable digital signature that may be appended to a hash record. In one embodiment, the record may be identified by a record identifier, such as a transaction ID. According to embodiments, by providing a record of the electronic identity and derivative being linked that is signed by the verification server, criminal actors may be prevented from enrolling fake or stolen identities into the authentication system.

At step S210, the verification server may insert the signed record into the identity request message, and may then forward the identity request message to a processing server computer for processing. The processing server computer may be processing server computer 150 of FIG. 1. In one embodiment, an allocated data field may be used to store the signed record in the message, so that it may be received and read by the processing server computer. The verification server may send the identity request message to the processing server computer using instructions stored in an identity request API, and by way of a network gateway.

At step S211, the processing server computer may receive the identity request message, and may link the electronic identity and derivative of the biometric template in a database. In one embodiment, the processing server computer may read allocated data fields for the electronic identity (eID) and for the derivative of the biometric template, and may then store the eID or copy of the eID along with an identifier for the derivative of the biometric template in a database where they may be linked. For example, the electronic identity, '754WD2E2513BF546050C2D079FF5D65AB6E318E' and the derivative ID, 'derivative #129578190' may be linked together in a row of a relational database or of a mapping table.

At step S212, the processing server computer may submit the derivative of the biometric template to an authentication server for storage. According to embodiments, the derivative of the biometric template may be stored in the authentication data database, where it may be later accessed and retrieved during authentication of a user. The authentication server may be authentication server 160 and the authentication data database may be authentication data database 160B of FIG. 1. In one embodiment, the processing server computer and authentication server may be the same server or of the same entity. In one embodiment, the processing server computer may also attach an identifier for the derivative, which the authentication server may receive and link to the derivative in the authentication data database. The identifier may be used as a reference at a later point in time when querying for the derivative.

At step S213, the processing server computer may sign the record generated by the verification server and may then publish the record to a public blockchain. The blockchain may be public blockchain 170C of FIG. 1. The record may be signed using the processing server computer's private key, and according to a digital signature algorithm. The processing server computer may append its digital signature to the record, and may then initiate the writing of the record into a data block and the publishing of the data block to a blockchain. The data block may later be read during authentication of a user in an interaction, such that the validity of the user's electronic identity and its certification into the biometric authentication program may be verified.

At step S214, the processing server computer may send the electronic identity to the mobile device. The processing server computer may generate an identity response message comprising the electronic identity, which it may send to the mobile device over a network such as the internet (e.g. via the network gateway). The identity response message may also comprise data indicating the successful enrollment for the user into the biometric authentication program, such as data for a confirmation message.

At step S215, the mobile device may receive the identity response message and may store the electronic identity in memory. The memory be application memory of the authentication application or may be a secure element of the mobile device. In one embodiment, the memory may be a cloud-based memory which may allow the mobile device to access the electronic identity from servers across a network. Once the enrollment and provisioning process has been completed, the user may later use his or her mobile device to prove his or her identity in an interaction.

At step S216, the user may present the mobile device in an interaction with a resource provider computer. For example, the user may interact with an access device using a communications interface of the mobile device, such as through Bluetooth or near-field communications. In one embodiment, the user may interact with the resource provider through a resource provider application stored on the user's mobile device. The resource provider application may allow for the exchange of data between the mobile device and the resource provider's server computers such that the user may be authenticated and granted resources, such as merchandise or requested services. The resource provider computer may be resource provider computer 120 of FIG. 1.

At step S217, the user may provide a second biometric sample to the mobile device. The biometric sample may be of the same biometric used during enrollment into the authentication program, taken at step S202. For example, if the user used an image of his or her face as a biometric during enrollment, the user may then take a current picture of his or herself during the interaction with the resource provider. In another example, if the user took a sample of his or her right index finger during enrollment, the user may then use the mobile device to take a sample of his or her right index finger during the interaction. The mobile device may take the biometric sample of the user and generate a second biometric template.

At step S218, the authentication application stored on the mobile device may generate a derivative of the second biometric template of the user. The derivative of the second biometric template may be generated in the same manner as the derivative of the first biometric template generated at step S203. This may be done such that matching samples should result in matching derivatives within a predetermined threshold.

At step S219, the mobile device may retrieve the electronic identity from memory. The memory may be the memory in which the electronic identity was stored in at step S215. In one embodiment, access to the electronic identity may be protected using a passphrase or username and password. For example, the electronic identity may be stored in a secure memory, in which access can only be granted to an application if the user enters his or her pin.

At step S220, the authentication application may append the electronic identity (eID) to the derivative of the second biometric template of the user. In one embodiment, the electronic identity and the derivative of the second biometric template may both be represented as a string of characters of predefined length. For example, the electronic identity may be a hash of 30 letters and numbers, and the derivative of the second biometric template may be a string of 100 characters representing mathematically derived feature data of a user's biometric sample. The appended eID and derivative may then be a string of 130 characters in length.

At step S221, the mobile device may generate an authentication request message comprising the appended electronic identity and derivative, and may send the authentication request message to the resource provider computer. The resource provider computer may then forward the authentication request message to a processing server computer, using an authentication API. The authentication API may be authentication API 122 of FIG. 1. At step S222, the processing server computer may receive the authentication request message.

At step S223, the processing server computer may decouple the electronic identity from the derivative of the second biometric template. In one embodiment, this may be done by determining the length of the electronic identity and the length of the derivative of the second biometric template, and then splitting the appended electronic identity and derivative into two separate data elements based on the length. For example, the processing server computer may determine that the electronic identity should be a string of 30 characters and that the derivative of the second biometric template should be a string of 100 characters. When the processing server computer receives a 130 character string in an authentication request message, it may declare a variable for the electronic identity to which it allocates the first 30 characters of the string, and may declare a variable for the derivative of the second biometric template to which it allocates the remaining 100 characters. In other embodiments, one or more designated characters may separate the electronic identity data and the derivative of the second biometric template. In yet other embodiments, these two pieces of data may be provided in known data fields.

At step S224, the processing server computer may determine from records, a derivative of a first biometric template linked to the electronic identity. This may be the derivative linked to the electronic identity at step S211. The record may be in the form of a mapping table or relational database, which the processing server computer may query for the electronic identity (eID) and identity derivatives and other data linked to the queried electronic identity. For example, the eID may be linked in a row of a relational database to an identifier for a derivative of a first biometric template of a user and to other additional information of the user such as name, address, etc. The identified derivative may be retrieved, by the processing server computer, from an authentication data database by sending a request to an authentication server. For example, the processing server computer may send a request comprising an identifier for the derivative of the first biometric template of the user (e.g. 'derivative #129578190'). The identifier may be used by the authentication server to query for the derivative, which the authentication server may submit to the processing server computer for comparison to the derivative of the second biometric template of the user.

At step S225, the processing server computer may compare the derivative of the second biometric template with the derivative of the first biometric template for a match. In one embodiment, this may be done, by comparing each data element of the derivative of the second biometric template to a corresponding data element of the derivative of the first biometric template. In some embodiments, two derivatives may be considered a match if less than a predetermined number of data elements differ. For example, the derivatives may be expressed as a string of equal length, and the processing server computer may compare each corresponding character (first, second, third, etc.) from each string to one another, and may determine a match if less than 10 characters differ. In other embodiments, two derivatives are a match if there is an exact match (e.g., as with two hashes of identical data derived from biometric samples obtained at different times).

Meanwhile, at step S226, the processing server computer may search for a record on the public blockchain relating to the electronic identity and first biometric template. The processing server computer may search the blockchain for a data block that comprises the electronic identity. In one embodiment, this may be done by scanning the blockchain for a data block comprising the record identifier generated at step S209. For example, the processing server computer may be coupled to a relational database, in which electronic identities are linked to entries for a transaction ID and transaction timestamp relating to the time at which an electronic identity was used to enroll a user into the biometric authentication program. The processing server computer may then search the blockchain for a record that comprises the transaction ID and transaction timestamp. In one embodiment, the record may comprise hashes of the electronic identity and of the derivative of the first biometric template, and the processing server computer may verify that the hashes of the electronic identity and of the derivative of the first biometric template match expected results. For example, the processing server computer may concatenate strings for the electronic identity and for the derivative and input the concatenated string into SHA256( ). The processing server computer may then determine if the resulting output matches a corresponding record identified on the blockchain. In embodiments, this type of verification may be seen as a first validation check.

At step S227, the processing server computer may validate the record by verifying one or more digital signatures appended to the record. In one embodiment, a digital signature may be verified by inputting the digital signature and the public key of the alleged signing entity into a verification algorithm and determining if the output matches expected results. At step S228, the processing server computer may determine an authentication result based at least upon the comparison of the derivatives and the validity of the electronic identity. According to embodiments, the authentication result may be considered positive (i.e. authentic user), if both of the derivatives of the biometric templates match and if the digital signatures appended to the record of the eID and derivative being linked (i.e. certificate of enrollment) are validated.

At step S229, the processing server computer may send the authentication result to the mobile device in an authentication response message. The authentication result may first be sent to the resource provider computer and then forwarded to the mobile device. If the authentication result is positive, then the resource provider computer may consider the user's credentials authentic and may grant access to a requested resource. For example, the resource provider computer may be a computer that unlocks the door of a building, and a positive authentication result may initiate actuators to disable the door's locking mechanism.

According to embodiments of the invention, the process described by FIGS. 2A and 2B may allow a user to prove his or her identity using secure biometric authentication. The biometric may be a fingerprint, image of the user's face, recording of the user's voice, etc. as provided by a biometric reader of the user's mobile device. A derived template of the user's biometrics may be first registered during enrollment and linked to an electronic identity unique to the user. The generation of the electronic identity and its association with the derivative of the biometric template may be represented as a record published on a public blockchain. The record may serve as a certificate of enrollment, and may be digitally signed by trusted entities (banks, government institutions, etc.) so as to provide greater validation checks. The electronic identity may be stored on the user's mobile device, and may be sent to a processing server computer to authenticate the user during an interaction with a resource provider. The authentication process may further comprise taking a second sample of a user's biometric to generate a derivative of a second biometric template that may be compared to the derivative generated during enrollment. The method provided can be more secure than other biometric authentication systems, in that a user's biometric template is derived so as to conceal the nature of data stored therein. Furthermore, the validity of the biometric template is also dependent on the validity of the electronic identity, as determined by the verification of digital signatures appended to a record on a blockchain. Thus, embodiments of the invention provide a method of authentication that is both more secure and more convenient than other means of proving one's identity.

Figure 3:
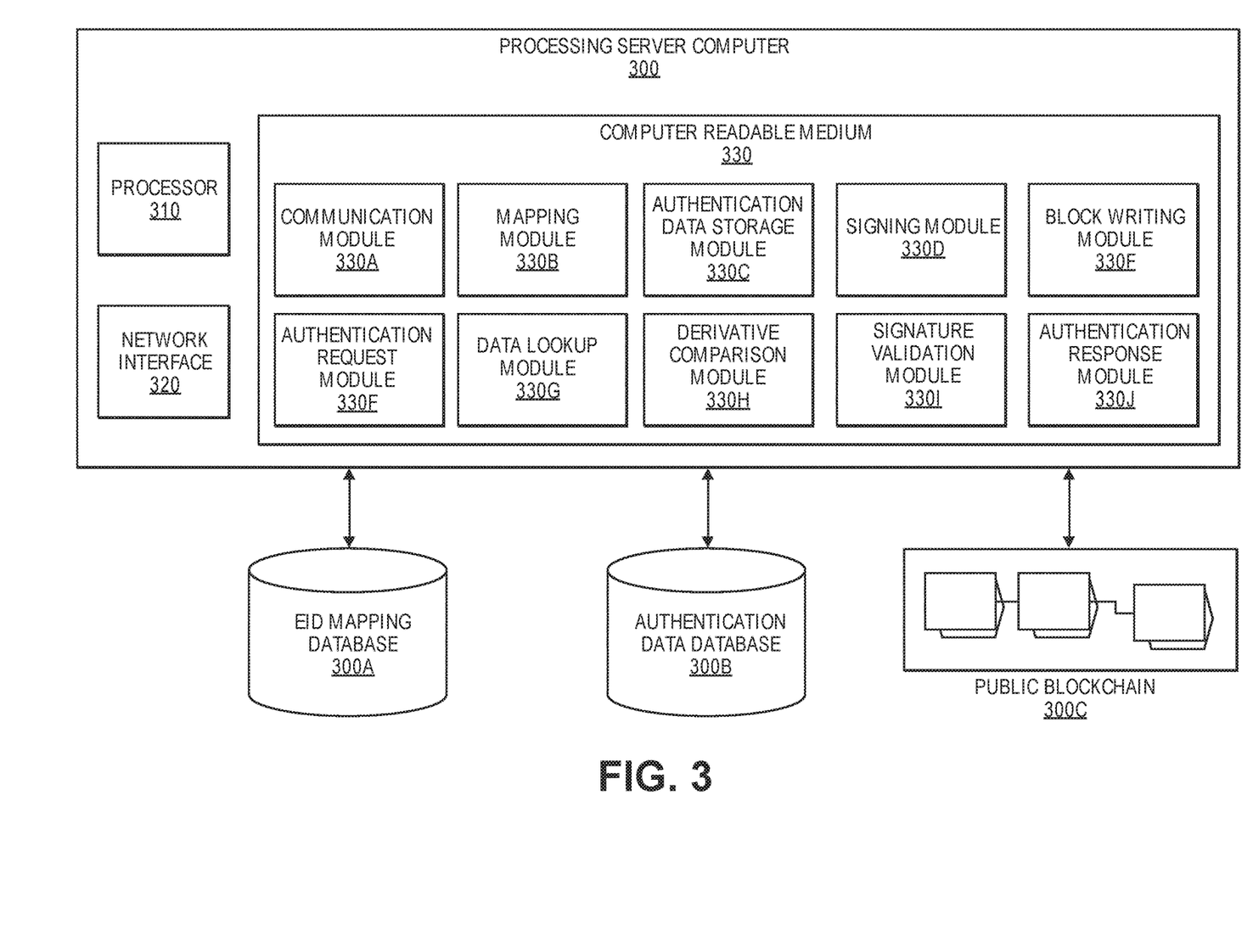
FIG. 3 shows a block diagram of a processing server computer for implementing biometric authentication.

FIG. 3 shows a block diagram of a processing server computer for implementing biometric authentication. Processing server computer 300 shown may be processing server computer 150 of FIG. 1. Processing server computer 300 may comprise a processor 310 for executing instructions, and a network interface 320 for communicating over a network. Processing server computer 300 may further comprise a computer readable medium 330. Computer readable medium 330 may be a memory storing executable instructions in the form of code. Computer readable medium 330 may comprise modules of code that may be executed by processor 310 such as communication module 330A, mapping module 330B, authentication data storage module 330C, signing module 330D, block writing module 330E, authentication request module 330F, data lookup module 330G, derivative comparison module 330H, signature validation module 330I, and authentication response module 330J. Processor server computer 330 may further be coupled to one or more databases such as eID mapping database 300A, authentication data database 300B, and public blockchain 300C.

EID mapping database 300A may be a database in which electronic identities are linked to user data. In embodiments, the user data may include a derivative of a biometric template of the user. During enrollment of a user into a biometric authentication program, processing server computer 300A may receive an identity request message comprising an electronic identity and a derivative of a biometric template of the user. Processing server computer 300A may then link the electronic identity to the derivative of the biometric template of the user in a mapping table (i.e. lookup table) of eID mapping database 300A, which may later be queried during authentication of the user. For example, eID mapping database 300A may be a relational database in which electronic identities in a column are each linked in a row to one or more identifiers for one or more derivatives of biometric templates. As explained above, an electronic identity may be a hash that is mathematically derived from information associated with a user.

A derivative of a biometric template may also be represented as a string, such as a string of altered pixel values for an image (e.g. "255 232 45 678 56 23 . . . 345 76 44 767 433 345"). In one embodiment, an identifier for the derivative of the biometric template may be stored in eID mapping database, rather than the derivative of the biometric template itself. Meanwhile, the derivative itself may be stored in authentication data database 300B. For example, a derivative may be identified by a derivative identifier, 'derivative #129578190,' which may be referenced by an authentication server to query for and retrieve the derivative from authentication data database 300B.

Authentication data database 300B may be a database in which user authentication data may be stored. In embodiments, the user authentication data may comprise a derivative of a biometric template of a user. In one embodiment, authentication data database 300B may be accessible by processing server computer 300, by way of an authentication server. For example, processing server computer 300 may send a request for authentication data to the authentication server, which may retrieve the authentication data from authentication data database 300B. The request may comprise an identifier for the authentication data, such as a derivative ID identifying a derivative of a biometric template of a user (e.g. 'derivative #129578190').

Public blockchain 300C may be a distributed database in which immutable records are stored and chained together. In one embodiment, the immutable records may comprise records for the certification of an electronic identity into a biometric authentication program. The immutable records may further be verifiable through a distributed verification network, in which records may be validated by trusted entities. The trusted entities may validate an immutable record by comparing digital signatures appended to the record using public keys of the signing entities. For example, a server computer of a payment processing network may validate a record by inputting the record and a public key of a bank that allegedly notarized the record into a verification algorithm, and then checking if the output matches expected results.

As explained above, processing server computer 300 may comprise a plurality of software modules, which may comprise instructions for executing tasks according to embodiments. Communication module 330A may comprise instructions for sending, receiving, and reformatting messages. The messages may be sent and received by processing server computer 300 over network interface 320. For example, processing server computer 300 may receive identity request messages and authentication request messages, and may send identity response messages and authentication messages over network interface 320.

Mapping module 330B may comprise instructions for mapping electronic identities to user data. The user data may include a derivative of a biometric template of a user. According to embodiments, a verification server may generate an electronic identity (eID) for a user upon verification of an account identifier of the user. The verification server may forward an identity request message comprising the eID and a derivative of a biometric template of the user to processing server computer 300. Mapping module 330B may comprise instructions for identifying data fields in an identity request message allocated for an eID and for a derivative. Mapping module 330B may further comprise instructions for reading the data fields, and storing data of the fields (or identifiers thereof) in a database. For example, the electronic identity and a derivative identifier may be stored in eID mapping database 300A, where they may be linked to each other in a mapping table. In one example, the processing server computer may store in a row of a relational database, an electronic identity for: 754WD2E2513BF546050C2D079FF5D65AB6E318E along with an identifier for a derivative of a biometric template, such as: 'derivative #129578190.' In another embodiment, the electronic identity may further be linked to an identifier for a record of the eID and derivative being linked, such as a transaction ID or certificate ID, which may be used to identify the record on public blockchain 300C.

Authentication data storage module 330C may comprise instructions for storing user authentication data in a database. According to embodiments, the authentication data may comprise a derivative of a biometric template of a user. In one embodiment, authentication data storage module 330C may comprise instructions for attaching an identifier to the derivative of the biometric template of the user, and may further comprise instructions for sending the derivative to an authentication server. The authentication server may store the derivative in authentication data database 300B along with its identifier, so that it may be identified and retrieved at a later time.

Signing module 330D may comprise instructions for signing a record using a private key. According to embodiments, records may be signed by trusted entities in a distributed verification network according to a digital signature algorithm. Processing server computer 300 may be a node of the distributed verification network, and signing module 330D may comprise code instructing processor 310 to sign a received record using its private key, in conjunction with the digital signature algorithm.

Block writing module 330E may comprise instructions for initiating of writing data to public blockchain 300C. According to embodiments, public blockchain 300C may be used to store records relating to the enrollment of a user into a biometric authentication program. Each record may comprise an indication of an electronic identity and a derivative of a biometric template of a user being linked. Each record may further comprise one or more digital signatures of trusted entities. In one embodiment, processing server computer 300 may initiate the publishing of records to public blockchain 300C by broadcasting a new data block. For example, block writing module 330E may comprise code instructing processor 310 to generate a new data block for a record. Block writing module 330E may further comprise instructions for broadcasting the new data block to public blockchain 300C so that a node of a distributed network storing copies of public blockchain 300C may publish the new data block. The method for writing to a public blockchain may vary according to the method of consensus established for the blockchain. Example methods of consensus governing the writing of blocks in a blockchain may include proof-of-work, proof-of-stake, proof-of-space, proof-of-authority, etc.

Authentication request module 330F may comprise instructions for decoding data received in an authentication request message. According to embodiments, an authentication request message may be received by processing server computer 300 from a resource provider computer so that processing server computer 300 may authenticate a user. In one embodiment, the authentication request message may comprise an electronic identity and derivative of a biometric template of the user. The electronic identity and the derivative may be included together in the authentication request message (e.g. as an appended string), and authentication request module 330F may comprise instructions for decoupling the electronic identity and derivative. Authentication request module 330F may comprise instructions for processor 310 to identify one or more data fields allocated for the electronic identity and derivative, read the one or more data fields, and to declare variables to which the electronic identity and derivative should be assigned. For example, processor 310 may determine that the first 30 characters of an appended string should be assigned and allocated as an electronic identity, and that the remaining 100 characters are assigned and allocated as a derivative.

Data lookup module 330G may comprise instructions for looking up data in a database, such as eID mapping database 300A. According to embodiments, when an authentication request message is received by processing server computer 300, processing server computer 300 may identify an electronic identity received in the message, and may determine a derivative of a biometric template linked to the electronic identity. The derivative linked to the electronic identity may be linked in eID mapping database 300A, and data lookup module 330G may comprise instructions for querying eID mapping database 300A for the electronic identity and any data linked to it. For example, eID mapping database 300A may be a relational database, and data lookup module 330G may include instructions for retrieving a row of data in the relational database that comprises an electronic identity received in an authentication request message. The row of data may further comprise an identifier for a derivative of a biometric template of a user (e.g. 'derivative #129578190').

Derivative comparison module 330H may comprise instructions for comparing derivatives for a first and second biometric template. According to some embodiments, a derivative of a first biometric template stored during enrollment may be compared to a derivative of a second biometric template to authenticate a user. In one embodiment, two derivatives may be considered a match if a predetermined number of data elements of the derivatives match. For example, derivatives of feature data for a user's fingerprint may be expressed as a string of characters representing a sequence of values. The sequence of values may be values for biometric template data that have been mathematically derived. A match may be determined by comparing each corresponding characters between two strings and determining if a predetermined number of characters match. In another example, a derivative of a sample of a user's face may be represented as a matrix of altered pixel values. A match may be determined by comparing each corresponding matrix element between two matrices and determining if a predetermined number of elements match. In other examples, a derivative may be expressed as a series of bits, bytes in an array, etc. Derivative comparison module 330H may comprise instructions for comparing data elements of two derivatives and determining a match if the data elements match within a predetermined threshold (e.g. at least 90% of characters matching between two strings). In some embodiments, the derivatives of the biometric templates can be compared by using less data than the entire biometric template, and the comparison process can use a "zero-knowledge proof" protocol in some embodiments.

Signature validation module 330I may comprise instructions for validating one or more digital signatures using one or more public keys. According to embodiments, during authentication, a record on public blockchain 300C may be searched and may comprise one or more digital signatures. In one embodiment, signature validation module 330I may comprise code instructing processing server computer 300 to validate the one or more signatures according to a digital signature algorithm (DSA). The code may comprise instructions for retrieving or obtaining one or more public keys of the signing entities, and verifying the one or more digital signatures with the one or more public keys, in conjunction with a verification algorithm. For example, the signing entities may include banks and governments, whom may allow access to their public keys in a distributed verification network. The public keys may be retrieved by processing server computer 300 and used to determine if the digital signatures appended to a record are valid.

Authentication response module 330J may comprise instructions for generating an authentication response comprising an authentication result. According to some embodiments, a user may be authenticated during an interaction upon the determination of a positive authentication result (i.e. user credentials determined to be authentic). In one embodiment, processing server computer 300 may determine an authentication result based on both the comparison of derivatives for a first and second biometric template of a user and based on the validity of an electronic identity. The comparison of derivatives may be determined using instructions from derivative comparison module 330H and the validity of the electronic identity (eID) may be based on the validation of one or more digital signatures appended to a record relating to the eID. Authentication response module 330J may comprise code for determining the authentication result, and for inserting the authentication result into an authentication response message. For example, authentication response module 330J may comprise instructions for generating a positive authentication result if a match occurs between compared derivatives and if an electronic identity is determined to be valid. Authentication response module 330J may further comprise code for inserting the positive authentication result in an authentication response message. The authentication response message comprising the authentication result may be then be sent to a resource provider computer and forwarded to a user device to authenticate the user of the device (e.g. for the purpose of gaining access to a network).

According to some embodiments of the invention, processing server computer 300 may process data to implement biometric authentication for users. The users may enroll into a biometric authentication program using a user device. The user device may be used to generate a derivative of a first biometric template of a user, and to request an electronic identity that may be certified in a record published to public blockchain 300C. The user device may store the user's electronic identity for later use in an interaction. During an interaction, the user device may generate a derivative of a second biometric template of the user, which may be sent to processing server computer 300. Processing server computer 300 may then authenticate the user based on the comparison of derivatives for the first and second biometric template of the user, and based on the validity of the electronic identity generated for the user.

Figure 4:
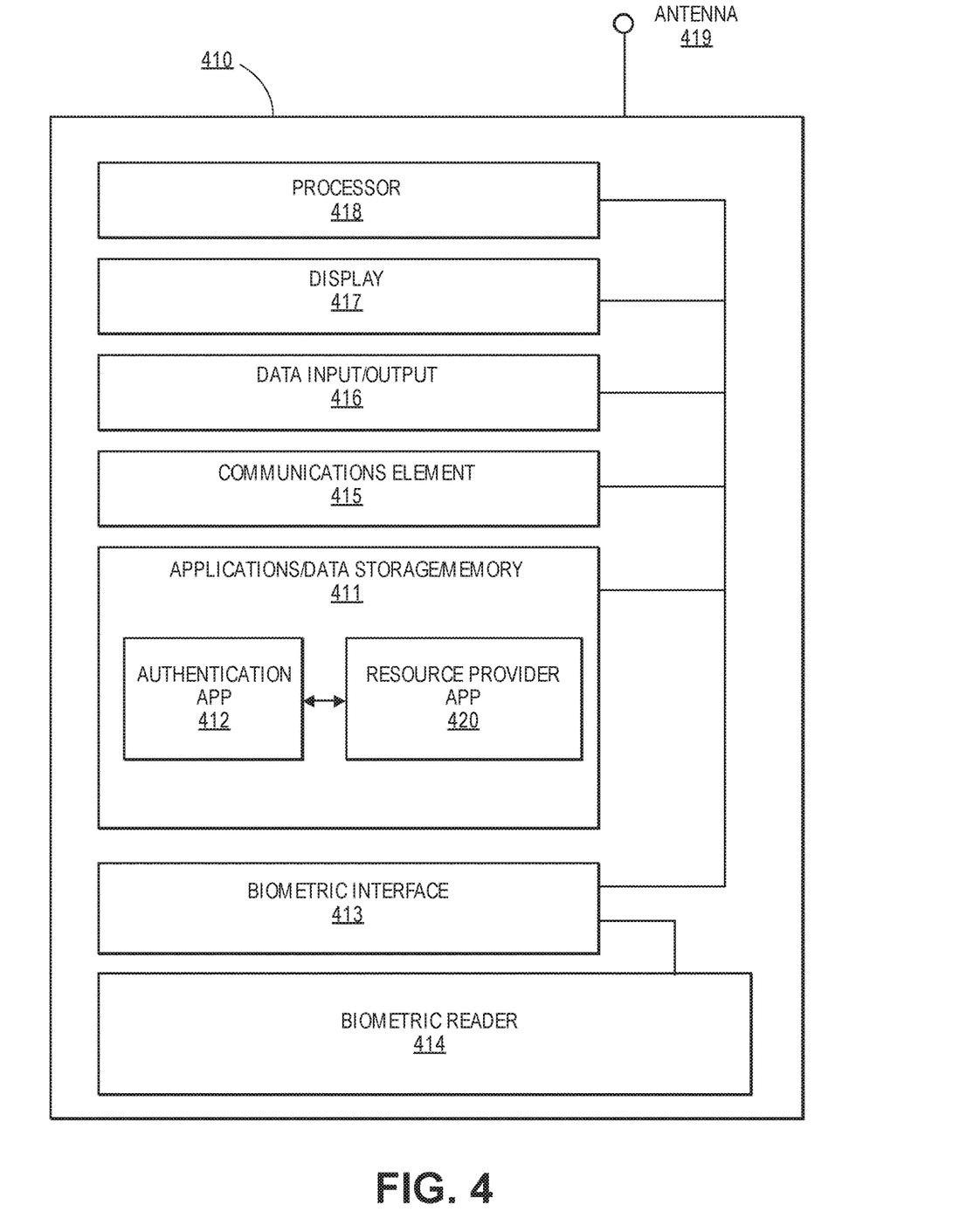
FIG. 4 shows a block diagram of a user device for implementing biometric authentication.

FIG. 4 shows a block diagram of a user device for implementing biometric authentication. User device 410 may be mobile device 110 of FIG. 1. User device 410 may comprise memory 411. Memory 411 may store data, such as data for one or more applications. The one or more applications may include authentication application 412 and resource provider application 420. User device 410 may further comprise biometric reader 414 for reading biometric samples of a user and biometric interface 413 for transmitting data between biometric reader 414 and an application of the user device. Examples of biometric reader 414 may include a fingerprint reader, a front-facing camera, a microphone, etc. User device 410 may further comprise communications element 415 for allowing communications between user device 410 and other devices, such as through wireless communications (e.g. via antenna 419).

In addition, user device 410 may also comprise data input/output 416 for receiving inputs from a user. For example, data input/output 416 may be an input element of a touchscreen from which display icons may be selected, and from which a virtual keyboard may be displayed to receive user commands. User device 410 may also comprise display 417 for displaying data to a user and processor 418 for processing data and executing instructions to complete tasks.

According to embodiments, a user may enroll into a biometric authentication program for proving his or her identity in an interaction with a resource provider. The interaction, may be, for example, a transaction with a merchant or a login attempt into a network. A user may enroll via authentication application 412, which may connect the user to one or more server computers over a network. Authentication application 412 may be used to derive a biometric template of the user taken from biometric interface 413 and biometric reader 414, which may be linked by one of the server computers to an electronic identity (eID) generated for the user. The eID may be stored on user device 410, and during an interaction, user device 410 may send the eID and a derivative of a second biometric template (e.g. via communications element 415 and antenna 419) to the server computer for authentication. An authentication result may be determined based on the comparison of the derivative of the second biometric template to the derivative of the first biometric template recorded during enrollment, and based on the validity of the electronic identity. User device 410 may then receive the authentication result, indicating if the user's identity has been successfully proven.

A number technical advantages are provided by the described embodiments over prior art. Embodiments of the invention allow a user to identify his or herself in an interaction using his or her mobile device. This eliminates the need to carry around physical identification cards, which may be inconvenient for users. According to embodiments, a user may simply identify his or herself using a biometric (e.g. by taking a current picture of his or her face, or by reading his or her fingerprint). Furthermore, embodiments of the invention are more secure than other biometric authentication methods previously conceived. For example, a user's biometric data is derived rather than sent in the clear, yet may still be verified without revealing a user's original biometric. In addition, embodiments of the invention subject the use of a user's biometric data to numerous validation checks involving digital signatures of trusted parties and immutable records. This may prevent a criminal actor from successfully using fake or stolen identities in the authentication system. In terms of the distributed nature of the identity verification and biometric authentication servers, embodiments of the invention provide APIs that allow for compatibility with a plurality of verification entities, thus allowing for ease of performing validation checks and providing greater security as needed.

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components.

A computer system can include a plurality of the same components or subsystems, e.g., connected together by an external interface. In some embodiments, computer systems, subsystem, or apparatuses can communicate over a network. In such instances, one computer can be considered a client and another computer a server. A client and a server can each include multiple systems, subsystems, or components, mentioned herein.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

It should be understood that the present invention as described above can be implemented in the form of control logic using hardware and/or using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method comprising:
   receiving, by a user device, a first biometric template of a user;
   generating, by the user device, a derivative of the first biometric template;
   generating, by the user device, an identity request message for an electronic identity for the user, the identity request message comprising the derivative of the first biometric template and an account identifier of the user;
   sending, by the user device, the identity request message to a verification server, wherein the verification server verifies the account identifier and generates the electronic identity, and wherein the electronic identity is linked to the derivative of the first biometric template in a database by a processing server computer, wherein the processing server computer initiates publishing of a record to a blockchain, the record comprising a record of the electronic identity and the derivative of the first biometric template of the user being linked, wherein the record of the electronic identity and the derivative of the first biometric template being linked is signed by the verification server and the processing server computer using a digital signature encryption scheme;
   receiving, by the user device, an identity response message comprising the electronic identity;
   storing, by the user device, the electronic identity in a memory of the user device;
   receiving, by the user device, a second biometric template of the user;
   providing, by the user device, an authentication request message comprising the electronic identity and a derivative of the second biometric template of the user to a resource provider computer to conduct an interaction, the authentication request message being forwarded to the processing server computer by the resource provider computer; and
   receiving, by the user device, an authentication response message comprising an authentication result from the processing server computer,
   wherein the authentication result is determined by the processing server computer based on a comparison of the derivative of the second biometric template to the derivative of the first biometric template accessible to the processing server computer, and wherein the authentication result is also based on a validity of the electronic identity.

2. The method of claim 1, wherein the validity of the electronic identity is based at least upon the record published on the blockchain of the electronic identity and the derivative of the first biometric template of the user being linked.

3. The method of claim 1, wherein the validity of the electronic identity is based at least upon validation of one or more digital signatures appended to the record of the electronic identity and the derivative of the first biometric template being linked.

4. The method of claim 1, wherein the derivative of the first biometric template and the derivative of the second biometric template are derived from the first biometric template and the second biometric template of the user, respectively, by passing the first and second biometric template through an algorithm.

5. The method of claim 1, wherein the derivative of the first biometric template is stored and retrieved by the processing server computer by communicating with an authentication server.

6. A server computer comprising:
   a network interface;
   a processor; and
   a non-transitory computer-readable medium comprising code for instructing the processor to implement a method, the method comprising:
   receiving, by the server computer, an identity request message comprising a derivative of a first biometric template and an electronic identity, wherein the electronic identity is received from a verification server after the verification server verifies an account identifier of a user;
   linking, by the server computer, the derivative of the first biometric template and the electronic identity in a mapping table;
   storing, by the server computer, the derivative of the first biometric template in a database;
   generating, by the server computer, an identity response message comprising the electronic identity, wherein the identity response message is received by a user device, and wherein the user device stores the electronic identity in a memory of the user device for later use in an interaction,
   initiating, by the server computer, publishing of a record to a blockchain, the record comprising a record of the electronic identity and the derivative of the first biometric template being linked, wherein the record on the blockchain of the electronic identity and the derivative of the first biometric template being linked is signed by the verification server and the server computer using a digital signature encryption scheme;

receiving, by the server computer, an authentication request message comprising the electronic identity and a derivative of a second biometric template of the user of the user device;

determining, by the server computer, that the derivative of the first biometric template is linked to the electronic identity;

retrieving, by the server computer, the derivative of the first biometric template;

comparing, by the server computer, the derivative of the first biometric template to the derivative of the second biometric template; and determining, by the server computer, an authentication result based at least upon the comparing of the derivative of the first biometric template to the derivative of the second biometric template and at least upon a validity of the electronic identity.

7. The server computer of claim 6, wherein determining the authentication result based at least upon the validity of the electronic identity comprises:

comparing, by the server computer, the electronic identity to a record on the blockchain of the electronic identity and the derivative of the first biometric template being linked; and validating, by the server computer, the electronic identity if the electronic identity matches the record published on the blockchain.

8. The server computer of claim 6, wherein determining the authentication result based at least upon the validity of the electronic identity comprises:

validating, by the server computer, digital signatures appended to the record published on the blockchain using public keys of at least the verification server.

9. The server computer of claim 6, wherein the derivative of the first biometric template and derivative of the second biometric template are derived from the first biometric template and the second biometric template of the user respectively by passing the first and second biometric template through an algorithm.

10. The server computer of claim 6, wherein storing the derivative of the first biometric template in the database comprises:

sending, by the server computer, the derivative of the first biometric template to an authentication server, wherein the authentication server stores the derivative of the first biometric template in the database, and wherein retrieving the derivative of the first biometric template comprises sending a request to the authentication server.

11. A resource provider computer comprising:

a network interface;

a processor; and a non-transitory computer-readable medium comprising code for instructing the processor to implement a method, the method comprising:

receiving, by the resource provider computer, an authentication request message from a user device of a user, the authentication request message comprising an electronic identity and a derivative of a second biometric template of the user, wherein the electronic identity is generated by a verification server upon verification of an account identifier of the user;

sending, by the resource provider computer, the authentication request message to a processing server computer, the processing server computer determining an authentication result based at least upon a comparison of the derivative of the second biometric template to a derivative of a first biometric template and based at least upon a validity of the electronic identity, wherein the validity of the electronic identity is based at least upon a record published on a blockchain of the electronic identity and the derivative of the first biometric template being linked, wherein the record published on the blockchain is signed by the verification server and the processing server computer using a digital signature encryption scheme;

receiving, by the resource provider computer, from the processing server computer, an authentication response message comprising the authentication result;

sending, by the resource provider computer, the authentication response message to the user device; and authenticating, by the resource provider computer, the user if the authentication result indicates that the derivative of the second biometric template and the derivative of the first biometric template match, and if the authentication result indicates that the electronic identity is valid.

12. The resource provider computer of claim 11, wherein the validity of the electronic identity is based at least upon validation of one or more digital signatures appended to the record published on the blockchain.

\* \* \* \* \*